United States Patent [19]

Cornu

[11] Patent Number: 5,638,624
[45] Date of Patent: Jun. 17, 1997

[54] MARKER DEVICE, IN PARTICULAR FOR ELECTRICAL CONDUCTORS AND TERMINAL BLOCKS

[75] Inventor: Hervé Cornu, Roumesnil Bouteilles, France

[73] Assignees: Legrand; Legrand SNC, both of Limoges, France

[21] Appl. No.: 513,086

[22] Filed: Aug. 9, 1995

[30] Foreign Application Priority Data

Sep. 6, 1994 [FR] France .................. 94 10651

[51] Int. Cl.⁶ .................................. G09F 3/00
[52] U.S. Cl. ................. 40/316; 40/666; 24/456
[58] Field of Search ............... 40/316, 317, 666, 40/306, 309, 334, 658; 24/456

[56] References Cited

U.S. PATENT DOCUMENTS

| | | | |
|---|---|---|---|
| 2,043,919 | 6/1936 | Bengtson | 40/316 X |
| 2,931,607 | 4/1960 | McFarland | 24/704.1 X |
| 3,068,600 | 12/1962 | Blanchet | 40/316 |
| 4,649,658 | 3/1987 | Sarton et al. | 40/316 |
| 5,067,213 | 11/1991 | Ragsdale et al. | 24/704.1 |

FOREIGN PATENT DOCUMENTS

| | | |
|---|---|---|
| 0121454 | 10/1984 | European Pat. Off. . |
| 2638879 | 5/1990 | France . |
| 17045 | of 1900 | United Kingdom .......... 40/666 |
| 887184 | 1/1962 | United Kingdom .......... 40/316 |
| 1039122 | 8/1966 | United Kingdom .......... 40/316 |

*Primary Examiner*—Brian K. Green
*Attorney, Agent, or Firm*—Young & Thompson

[57] ABSTRACT

A marker device includes a plate receiving an identifying message and at least one pair of arms facing each other and adapted to attach the device to a support. Each arm includes in the gap between them a finger extending towards the plate. Over at least the width of the finger in the direction parallel to the lengthwise direction of the plate, the arms each lie alongside a respective opening in the plate providing access to the finger. One application of the device is to marking electrical conductors and/or electrical devices such as terminal blocks, for example, provided with an appropriate support.

8 Claims, 1 Drawing Sheet

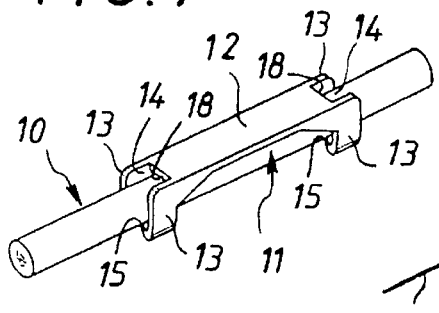
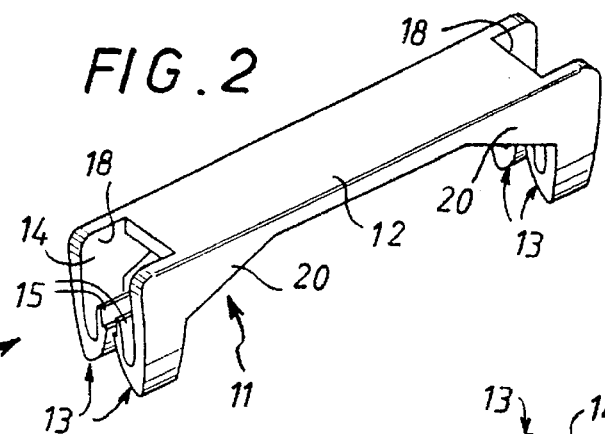
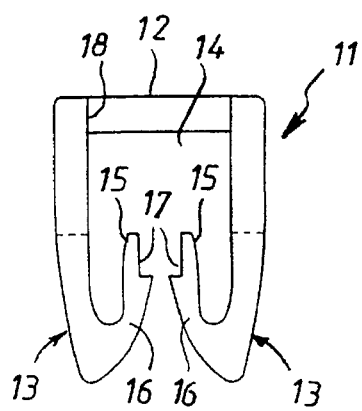
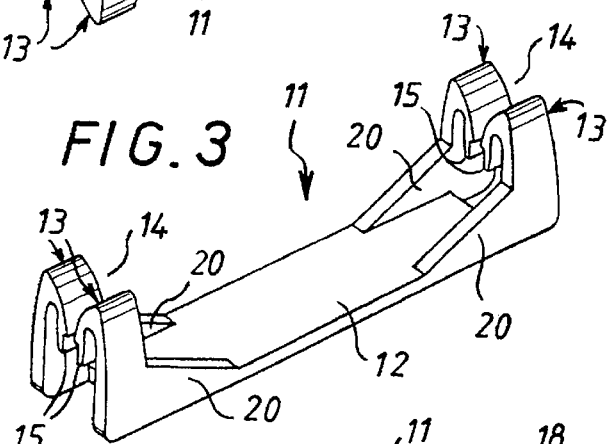
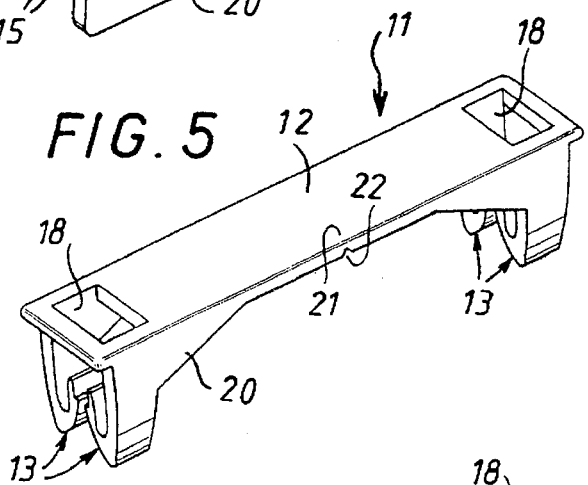
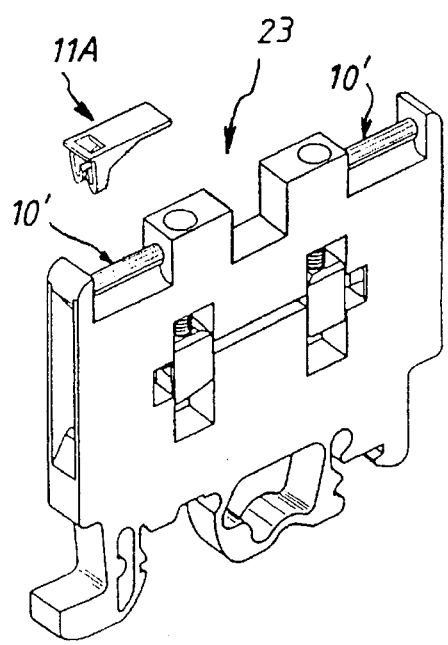
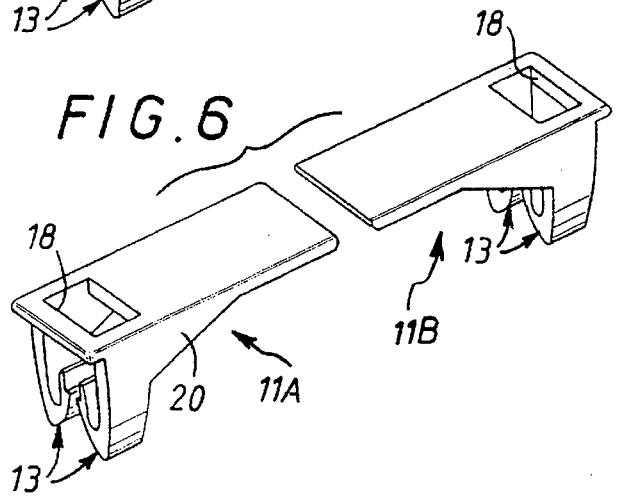

1

MARKER DEVICE, IN PARTICULAR FOR ELECTRICAL CONDUCTORS AND TERMINAL BLOCKS

BACKGROUND OF THE INVENTION

1. Field of the invention

The present invention relates generally to marker devices of the kind including a plate adapted to receive an identifying message and at least one pair of arms which, facing each other, are adapted to attach the device to a support and which each incorporate a finger extending towards the plate in the gap between them.

2. Description of the prior art

Marker devices of this type are the subject matter of U.S. Pat. No. 4,649,658, for example.

In this U.S. patent, which is concerned in practise with the marking of electrical conductors, the plate is adapted to receive only a relatively short identifying message, a single letter or a single digit, for example, a plurality of marking devices having to be disposed side by side to make up a more complex identifying message.

The plate is therefore relatively small, and has only one pair of arms.

U.S. Pat. No. 3,068,600 discloses marker devices in which the plate is large enough to receive a relatively large identifying message, if not directly then at least through the intermediary of a label placed within it. This device includes two spaced separate fixing means for attaching it to an electrical conductor to be marked.

These are not arms with fingers of the type described in U.S. Pat. No. 4,649,658, but rather U-shape lugs adapted to enclose part of the perimeter of the electrical conductor to which the device is fitted.

A marker device of this kind is relatively complex to manufacture and is also difficult to fit to an electrical conductor.

If arms with fingers of the type described in U.S. Pat. No. 4,649,658 are substituted for the U-shape lugs, the device is easier to fit to an electrical conductor but remains complex to manufacture.

A general object of the present invention is an arrangement adapted to simplify its manufacture in this case.

SUMMARY OF THE INVENTION

To be more precise, the present invention consists in a marker device including a plate adapted to receive an identifying message and at least one pair of arms facing each other and adapted to attach the device to a support, each arm including in the gap between them a finger extending towards the plate, wherein, over at least the width of the finger in the direction parallel to the lengthwise direction of the plate, the arms each lie alongside a respective opening in the plate providing access to the finger.

Accordingly, when the device is molded, a passage is advantageously left for the punch required to mold the fingers on the arms so that the mold does not require any mobile core, which is advantageous from the productivity (and therefore the cost) point of view.

The marker device of the invention advantageously includes two spaced pairs of arms for improved attachment to the support to which it is fitted, although this is not mandatory.

This support can be an electrical conductor, in the usual way.

2

As an alternative, however, it can be any other support having a similar configuration, for example a dummy electrical conductor provided for this purpose on any electrical device, such as a terminal block, to be marked.

In accordance with a further feature of the invention, when there are two spaced pairs of arms, the plate can advantageously include a generally transverse weakened area such that the device can be divided into two sections each comprising one pair of arms.

One of these sections can then be attached to one end of an electrical conductor, for example, and the other to the electrical device to which the other end of the electrical conductor is connected.

As the two sections were originally joined together, the risk of errors in applying corresponding identifying messages, which usually have to be identical, is advantageously minimized.

The features and advantages of the invention will emerge from the following description given by way of example with reference to the appended diagrammatic drawings.

BRIEF DESCRIPTION OF THE DRAWINGS

FIG. 1 is a perspective view of a marker device of the invention shown fitted to an electrical conductor.

FIG. 2 is a perspective top view of the marker device shown on its own and to a larger scale.

FIG. 3 is a perspective bottom view of the device.

FIG. 4 is an end view of the device as seen in the direction of the arrow IV in FIG. 2 and to a larger scale.

FIG. 5 is a perspective view analogous to that of FIG. 2 showing an alternative embodiment of the device before it is divided into two sections.

FIG. 6 is a perspective view analogous to that of FIG. 5 after such division.

FIG. 7 is a perspective view showing the fitting of one of the sections thus obtained to an electrical device.

DETAILED DESCRIPTION 9F THE PREFERRED EMBODIMENTS

FIG. 1 shows the application of the invention to marking an electrical conductor 10.

The electrical conductor 10 is marked in a manner that is known in itself by means of a marker device 11 including a plate 12 adapted to receive an identifying message (not shown) and at least one pair of arms 13 facing each other and adapted to attach it to a support, in this instance to the electrical conductor 10. Each arm has a finger 15 extending towards the plate 12 in the gap 14 between the arms.

The arms 13 are in practice of the type described in U.S. Pat. No. 4,649,658.

As the arms 13 are therefore well known in themselves, they are not described in detail here.

Suffice to say that their fingers 15 are joined to them through a thinner area 16 forming a hinge and that, initially generally parallel to each other, in their rest position, as shown in FIG. 4, the fingers 15 can give elastically relative to each other to surround the electrical conductor 10.

In other words, the elasticity of the fingers 15 combines with their own elasticity so that the arms 13 grip onto the electrical conductor 10, holding the latter between them and the plate 12.

In the embodiments shown and as described in U.S. Pat. No. 4,649,658, the fingers 15 on the arms 13 have respective mutually facing notches 17.

The plate 12 is elongate in shape in the lengthwise direction of the electrical conductor 10.

In the embodiment shown, the plate is rectangular but it can be any other shape, for example oval in shape.

In accordance with the invention, over at least the width of the finger 15 in the direction parallel to the lengthwise dimension of the plate 12 the arms 13 lie alongside respective openings 18 in the plate 12 providing access to the finger 15.

In the embodiments shown the marker device 11 includes two spaced pairs of arms 13 and the latter are in practice at respective opposite ends of the plate 12.

In the embodiment shown in FIGS. 1 through 4 the opening 18 in the plate 12 in line with at least one of the pairs of arms 13 (both of the latter in practise) is a notch opening onto the corresponding transverse edge of the plate 12.

In the embodiment shown in FIGS. 5 and 6 the opening 18 in the plate 12 adjoining at least one of the pairs of arms 13 (both of the latter in practise) is a closed contour opening.

In this case, as shown, the plate 12 extends cantilever-fashion beyond each of the pairs of arms 13.

In all cases the arms 13 in practise extend along and flush with the longitudinal edges of the plate 12.

In the embodiments shown, each arm 13 is integral with a flange 20 which, to stiffen the device, extends it continuously from the side opposite the corresponding transverse edge of the plate 12 until it merges with the plate 12 and which in practise extends beyond the corresponding opening 18 of the plate 12, towards the median area of the latter.

In the embodiment shown in FIGS. 5 and 6 the plate 12 has a generally transverse weakened area 21 between the two pairs of arms 13 adapted to allow the device to be divided into two sections 11A, 11B each having one pair of arms 13.

As shown here, for example, the weakened area 21 is produced by a groove 22 in the bottom surface of the plate 12 and extending generally transversely across the middle of the plate, perpendicularly to its longitudinal edges.

In the embodiment shown the groove 22 has a triangular transverse cross-section.

When the two sections 11A, 11B have been separated, one of them (section 11B in this instance) can be used to mark an electrical conductor (not shown) while the other (section 11A) can be used to mark an electrical device 23 to which that electrical conductor is connected.

The electrical device 23 is a terminal block, for example, as shown in FIG. 7.

To receive a marker device section 11A, 11B of the above type, it locally incorporates at least one support 10' constituting a elongate dummy electrical conductor 10 having the same generally cylindrical configuration as the electrical conductor 10.

Of course, the present invention is not limited to the embodiments described and shown, but encompasses any various execution and/or combination of the various part thereof.

There is claimed:

1. Marker device comprising a longitudinally extending plate for receiving an identifying message, at least one pair of arms facing each other and adapted to attach the device to a support, said at least one pair of arms being attached to said plate, said at least one pair of arms having fingers disposed in a space between said at least one pair of arms and extending in a direction towards said plate, an opening being defined in said plate for providing access to said fingers through said plate, said at least one pair of arms bordering on opposite sides of said opening, said opening having a longitudinal dimension at least as great as a longitudinal dimension of said fingers.

2. Marker device according to claim 1 wherein said at least one pair of arms comprise two pairs of arms, longitudinally spaced from each other.

3. Marker device according to claim 2 wherein said plate includes between said two pairs of arms, a generally transversely extending zone of weakness to facilitate division of the marker device into a pair of marker devices.

4. Marker device according to claim 2 wherein said two pairs of arms are disposed at respective opposite ends of said plate.

5. Marker device according to claim 4 wherein said opening in said plate comprises a notch opening onto an adjacent transverse edge of said plate.

6. Marker device according to claim 2, wherein said opening in said plate has a closed contour.

7. Marker device according to claim 1 said opening in said plate for said at least one pair of arms comprises a notch opening onto an adjacent transverse edge of said plate.

8. Marker device according to claim 1 wherein said opening in said plate for said at least one pair of arms has a closed contour.

* * * * *